United States Patent
Levas et al.

(10) Patent No.: US 9,684,714 B2
(45) Date of Patent: Jun. 20, 2017

(54) USING PARAPHRASE METRICS FOR ANSWERING QUESTIONS

(71) Applicant: International Business Machines Corporation, Armonk, NY (US)

(72) Inventors: Anthony T. Levas, Yorktown Heights, NY (US); James W. Murdock, IV, Millwood, NY (US); John M. Prager, Pomona, NY (US); Benjamin P. Segal, Hyde Park, NY (US); Timothy P. Winkler, Clinton, MA (US)

(73) Assignee: International Business Machines Corporation, Armonk, NY (US)

( * ) Notice: Subject to any disclaimer, the term of this patent is extended or adjusted under 35 U.S.C. 154(b) by 360 days.

(21) Appl. No.: 14/579,612

(22) Filed: Dec. 22, 2014

(65) Prior Publication Data

US 2016/0179939 A1 Jun. 23, 2016

(51) Int. Cl.
*G06F 17/30* (2006.01)

(52) U.S. Cl.
CPC .. *G06F 17/30684* (2013.01); *G06F 17/30654* (2013.01); *G06F 17/30731* (2013.01)

(58) Field of Classification Search
USPC .......................... 707/728, 774, 749, 725, 769
See application file for complete search history.

(56) References Cited

U.S. PATENT DOCUMENTS

| | | | |
|---|---|---|---|
| 8,332,394 B2 | 12/2012 | Fan et al. | |
| 2007/0022099 A1* | 1/2007 | Yoshimura | G06F 17/30654 |
| 2007/0203863 A1* | 8/2007 | Gupta | G06N 99/005 706/20 |
| 2009/0287678 A1 | 11/2009 | Brown et al. | |
| 2009/0292687 A1 | 11/2009 | Fan et al. | |
| 2011/0066587 A1 | 3/2011 | Ferrucci et al. | |
| 2011/0125734 A1 | 5/2011 | Duboue et al. | |
| 2012/0078888 A1 | 3/2012 | Brown et al. | |
| 2012/0078895 A1 | 3/2012 | Chu-Carroll et al. | |

(Continued)

OTHER PUBLICATIONS

Disclosed Anonymously, "Method of Computing Relevancy Score in a Question and Answering System", IP.com No. IPCOM000222407D, Oct. 2, 2012, 4 pages.

Disclosed Anonymously, "System and Method for Generating Paraphrase Data using a Multi-Player Game Based Grammar Learning Tool", IP.com No. IPCOM000236958D, May 23, 2014, 5 pages.

(Continued)

*Primary Examiner* — Cam-Linh Nguyen
(74) *Attorney, Agent, or Firm* — Stephen R. Tkacs; Stephen J. Walder, Jr.; William J. Stock (57) ABSTRACT

A mechanism is provided in a data processing system for using paraphrase metrics for answering questions. The mechanism receives an input question and generating a candidate answer from a corpus of information. The candidate answer has a supporting passage from the corpus of information. The mechanism divides the input question into a first sequence of tokens and divides the supporting passage into a second sequence of tokens. The mechanism identifies a plurality of subsequences of tokens within the second sequence of tokens and applies a paraphrase metric to compare the first sequence of tokens to each of the plurality of subsequences of tokens to generate a plurality of paraphrase metric scores. The mechanism then determines a confidence score for the candidate answer based on a highest paraphrase metric score within the plurality of paraphrase metric scores.

11 Claims, 5 Drawing Sheets

(56) References Cited

U.S. PATENT DOCUMENTS

| | | | |
|---|---|---|---|
| 2013/0007055 A1 | 1/2013 | Brown et al. | |
| 2013/0018652 A1 | 1/2013 | Ferrucci et al. | |
| 2013/0066886 A1 | 3/2013 | Bagchi et al. | |
| 2013/0262501 A1* | 10/2013 | Kuchmann-Beauger | G06F 17/30958 707/769 |
| 2014/0006012 A1* | 1/2014 | Zhou | G06F 17/30654 704/9 |
| 2015/0347587 A1* | 12/2015 | Allen | G06F 17/30654 707/725 |
| 2016/0034565 A1* | 2/2016 | Bastide | G06F 17/3043 707/749 |
| 2016/0048514 A1* | 2/2016 | Allen | G06F 17/3043 707/731 |
| 2016/0063381 A1* | 3/2016 | Allen | G06F 17/277 706/11 |
| 2016/0078354 A1* | 3/2016 | Petri | G06N 5/02 706/50 |
| 2016/0098394 A1* | 4/2016 | Bruno | G06F 17/2785 704/9 |
| 2016/0110415 A1* | 4/2016 | Clark | G06F 17/30637 707/774 |
| 2016/0180726 A1* | 6/2016 | Ahuja | G09B 7/00 434/322 |

OTHER PUBLICATIONS

Disclosed Anonymously, "Using a Cognitive System to Assemble Multiple Answers into a Single Response", IP.com No. IPCOM000238536D, Sep. 3, 2014, 4 pages.

High, Rob, "The Era of Cognitive Systems: An Inside Look at IBM Watson and How it Works", IBM Corporation, Redbooks, Dec. 12, 2012, 16 pages.

Madnani, Nitin et al., "Re-examining Machine Translation Metrics for Paraphrase Identification", 2012 Conference of the North American Chapter of the Association for Computational Linguistics: Human Language Technologies, Montreal, Canada, Jun. 3-8, 2012, pp. 182-190.

McCord, M.C. et al., "Deep parsing in Watson", IBM J. Res. & Dev. vol. 56 No. 3/4 Paper 3, May/Jul. 2012, pp. 3:1-3:15.

Wu. Yu-Chieh et al., "A New passage Ranking Algorithm for Video Question Answering", 2006 Pacific-Rim Symposium on Image and Video Technology (PSIVT), LNCS 4319, Dec. 11-13, 2006. pp. 563-572.

Wu, Yu-Chieh et al., "A Robust Passage Retrieval Algorithm for Video Question Answering", IEEE Transactions on Circuits and Systems for Video technology, vol. 18, No. 10, Oct. 2008, pp. 1411-1421.

Yuan, Michael J. , "Watson and healthcare, How natural language processing and semantic search could revolutionize clinical decision support", IBM developerWorks, IBM Corporation, Apr. 12, 2011, 14 pages.

* cited by examiner

USING PARAPHRASE METRICS FOR ANSWERING QUESTIONS

BACKGROUND

The present application relates generally to an improved data processing apparatus and method and more specifically to mechanisms for using paraphrase metrics for answering questions.

With the increased usage of computing networks, such as the Internet, humans are currently inundated and overwhelmed with the amount of information available to them from various structured and unstructured sources. However, information gaps abound as users try to piece together what they can find that they believe to be relevant during searches for information on various subjects. To assist with such searches, recent research has been directed to generating Question and Answer (QA) systems which may take an input question, analyze it, and return results indicative of the most probable answer to the input question. QA systems provide automated mechanisms for searching through large sets of sources of content, e.g., electronic documents, and analyze them with regard to an input question to determine an answer to the question and a confidence measure as to how accurate an answer is for answering the input question.

IBM Watson™ is an application of advanced natural language processing, information retrieval, knowledge representation and reasoning, and machine learning technologies to the field of open domain question answering. IBM Watson™ is built for answering questions using hypothesis generation, massive evidence gathering, analysis, and scoring. Generally, IBM Watson™ takes an input question, analyzes it, decomposes the question into constituent parts, generates one or more hypothesis based on the decomposed question and results of a primary search of answer sources, performs hypothesis and evidence scoring based on a retrieval of evidence from evidence sources, performs synthesis of the one or more hypothesis, and based on trained models, performs a final merging and ranking to output an answer to the input question along with a confidence measure.

SUMMARY

In one illustrative embodiment, a method, in a data processing system, is provided for using paraphrase metrics for answering questions. The method comprises receiving an input question and generating a candidate answer from a corpus of information. The candidate answer has a supporting passage from the corpus of information. The method further comprises dividing the input question into a first sequence of tokens and dividing the supporting passage into a second sequence of tokens. The method further comprises identifying a plurality of subsequences of tokens within the second sequence of tokens and applying a paraphrase metric to compare the first sequence of tokens to each of the plurality of subsequences of tokens to generate a plurality of paraphrase metric scores. The method further comprises determining a confidence score for the candidate answer based on a highest paraphrase metric score within the plurality of paraphrase metric scores.

In other illustrative embodiments, a computer program product comprising a computer useable or readable medium having a computer readable program is provided. The computer readable program, when executed on a computing device, causes the computing device to perform various ones of, and combinations of, the operations outlined above with regard to the method illustrative embodiment.

In yet another illustrative embodiment, a system/apparatus is provided. The system/apparatus may comprise one or more processors and a memory coupled to the one or more processors. The memory may comprise instructions which, when executed by the one or more processors, cause the one or more processors to perform various ones of, and combinations of, the operations outlined above with regard to the method illustrative embodiment.

These and other features and advantages of the present invention will be described in, or will become apparent to those of ordinary skill in the art in view of, the following detailed description of the example embodiments of the present invention.

BRIEF DESCRIPTION OF THE DRAWINGS

The invention, as well as a preferred mode of use and further objectives and advantages thereof, will best be understood by reference to the following detailed description of illustrative embodiments when read in conjunction with the accompanying drawings, wherein.

DETAILED DESCRIPTION

The illustrative embodiments provide mechanisms for using paraphrase metrics for answering questions. Paraphrase metrics are metrics that take two pieces of text and provide a score that is intended to indicate the extent to which the two pieces of text are paraphrases of each other. The illustrative embodiments employ paraphrase metrics for a related but distinct task: answering questions. Specifically, the illustrative embodiments address the task of scoring a passage that contains one or more candidate answers to determine whether the passage answers the question.

Simply applying the metric with the question and the passage as inputs is insufficient for addressing the task of answering questions. A question typically has a focus (what is being asked about) that is expected to align with a candidate answer, even though the answer itself will not be found in a well-formed question. Also, machine translation metrics are designed with the expectation that the inputs have roughly the same length and that inputs labeled as "correct" have roughly the same content.

In contrast, passages that answer a question may also contain additional information. Paraphrase metrics are designed to penalize texts that provide additional information, because extra content suggests that two paraphrases are not equivalent. Furthermore, some questions may have irrelevant information such as digressions or side comments, and passages that answer all the important parts of a question may also seem like poor matches to a paraphrase metric. Therefore, some passages that are very good for answering a question may seem like relatively poor paraphrases to these metrics. The illustrative embodiments provide mechanisms for selecting portions of the question and portions of the passage to align, applying the paraphrase metrics to those portions only, and then combining the results from those metrics to form a conclusion about how well the passage answers the question.

Machine translation metrics are algorithms designed to evaluate the effectiveness of machine translation systems. Machine translation metrics take as input pairs of texts consisting of a machine generated translation being evaluated and a translation that is labeled correct or incorrect by a human expert. While these metrics were originally designed to evaluate machine translation, the mechanisms of the illustrative embodiments employ these metrics for a different purpose, one that does not involve machine translation or reasoning across multiple languages.

Before beginning the discussion of the various aspects of the illustrative embodiments in more detail, it should first be appreciated that throughout this description the term "mechanism" will be used to refer to elements of the present invention that perform various operations, functions, and the like. A "mechanism," as the term is used herein, may be an implementation of the functions or aspects of the illustrative embodiments in the form of an apparatus, a procedure, or a computer program product. In the case of a procedure, the procedure is implemented by one or more devices, apparatus, computers, data processing systems, or the like. In the case of a computer program product, the logic represented by computer code or instructions embodied in or on the computer program product is executed by one or more hardware devices in order to implement the functionality or perform the operations associated with the specific "mechanism." Thus, the mechanisms described herein may be implemented as specialized hardware, software executing on general purpose hardware, software instructions stored on a medium such that the instructions are readily executable by specialized or general purpose hardware, a procedure or method for executing the functions, or a combination of any of the above.

The present description and claims may make use of the terms "a", "at least one of", and "one or more of" with regard to particular features and elements of the illustrative embodiments. It should be appreciated that these terms and phrases are intended to state that there is at least one of the particular feature or element present in the particular illustrative embodiment, but that more than one can also be present. That is, these terms/phrases are not intended to limit the description or claims to a single feature/element being present or require that a plurality of such features/elements be present. To the contrary, these terms/phrases only require at least a single feature/element with the possibility of a plurality of such features/elements being within the scope of the description and claims.

In addition, it should be appreciated that the following description uses a plurality of various examples for various elements of the illustrative embodiments to further illustrate example implementations of the illustrative embodiments and to aid in the understanding of the mechanisms of the illustrative embodiments. These examples intended to be non-limiting and are not exhaustive of the various possibilities for implementing the mechanisms of the illustrative embodiments. It will be apparent to those of ordinary skill in the art in view of the present description that there are many other alternative implementations for these various elements that may be utilized in addition to, or in replacement of, the examples provided herein without departing from the spirit and scope of the present invention.

Figure 1:
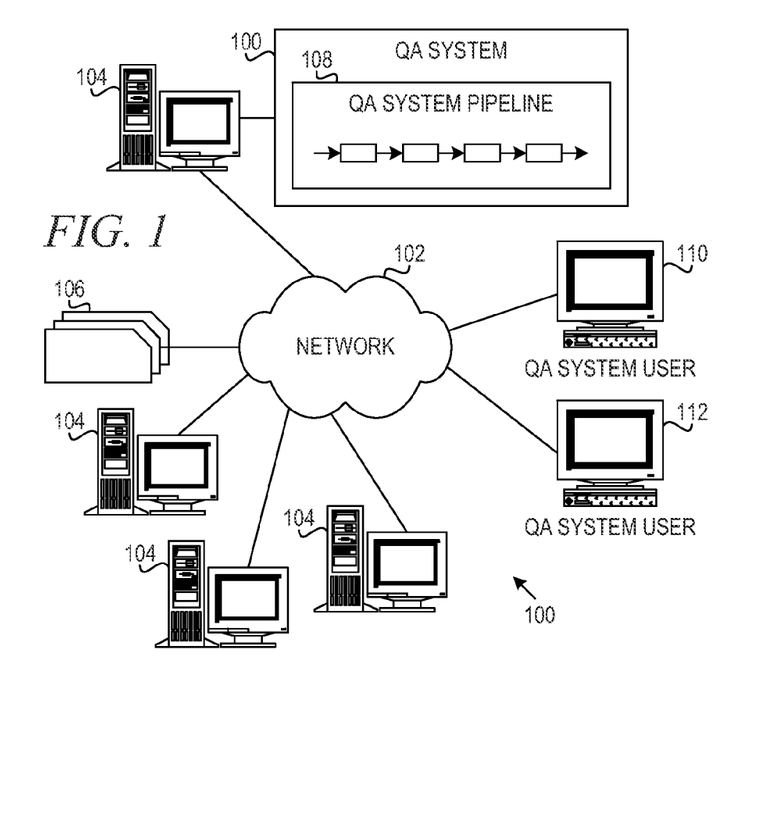
FIG. 1 depicts a schematic diagram of one illustrative embodiment of a question/answer creation (QA) system in a computer network.
Figure 2:
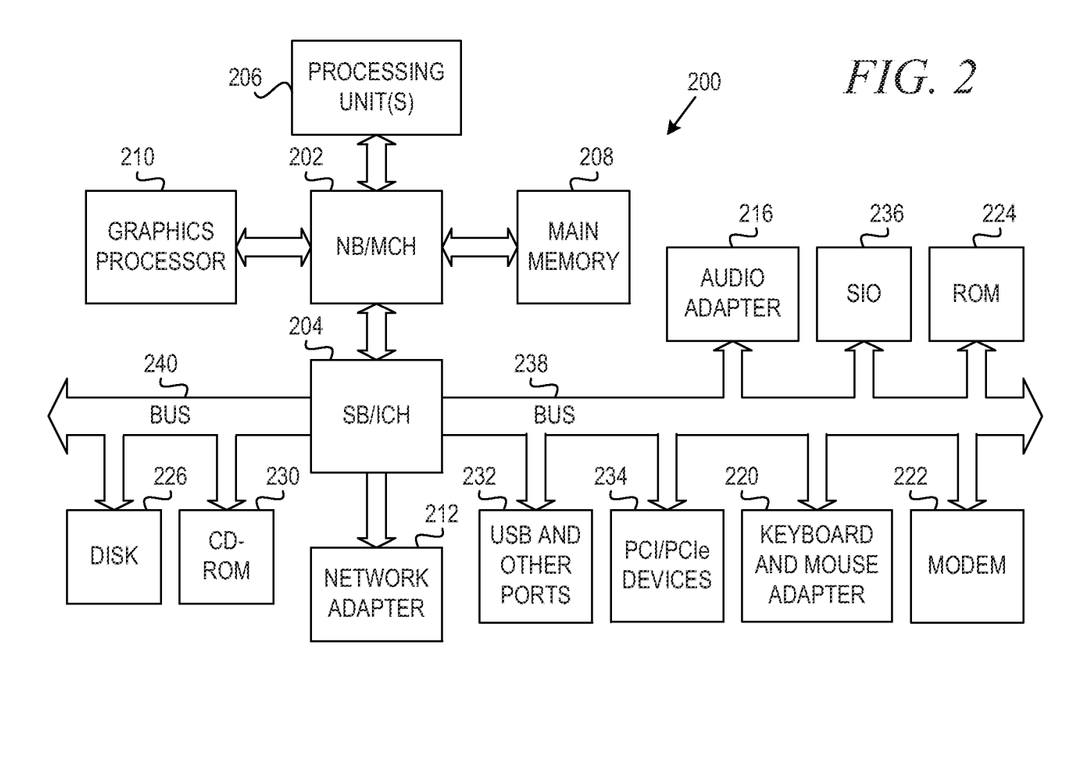
FIG. 2 is a block diagram of an example data processing system in which aspects of the illustrative embodiments are implemented.
Figure 3:
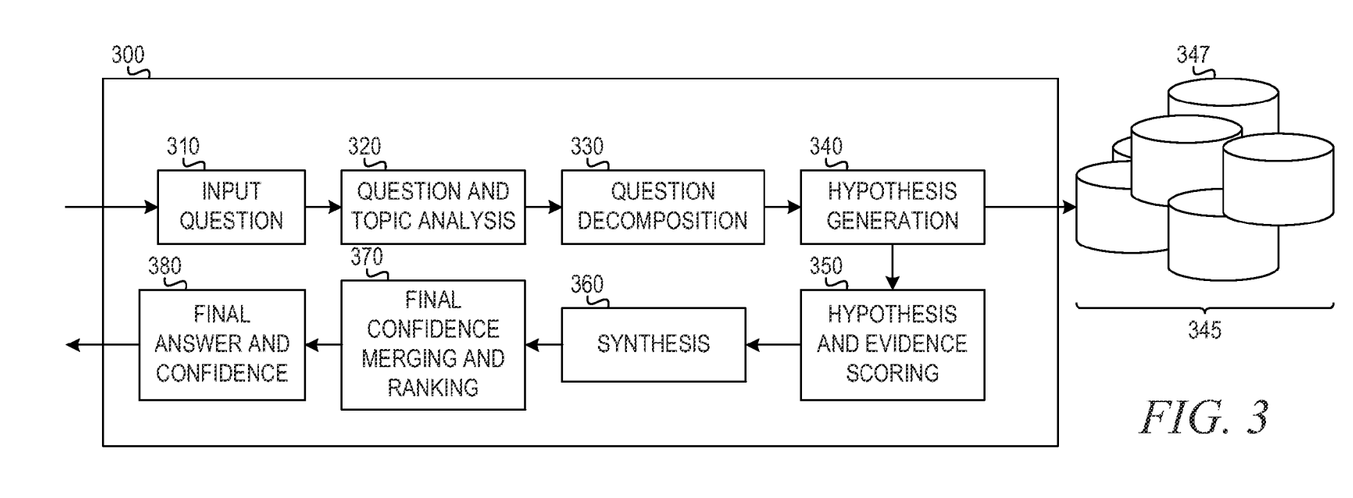
FIG. 3 illustrates a QA system pipeline for processing an input question in accordance with one illustrative embodiment.

The illustrative embodiments may be utilized in many different types of data processing environments. In order to provide a context for the description of the specific elements and functionality of the illustrative embodiments, FIGS. 1-3 are provided hereafter as example environments in which aspects of the illustrative embodiments may be implemented. It should be appreciated that FIGS. 1-3 are only examples and are not intended to assert or imply any limitation with regard to the environments in which aspects or embodiments of the present invention may be implemented. Many modifications to the depicted environments may be made without departing from the spirit and scope of the present invention.

FIGS. 1-3 are directed to describing an example Question Answering (QA) system (also referred to as a Question/Answer system or Question and Answer system), methodology, and computer program product with which the mechanisms of the illustrative embodiments are implemented. As will be discussed in greater detail hereafter, the illustrative embodiments are integrated in, augment, and extend the functionality of these QA mechanisms with regard to using paraphrase metrics for answering questions.

Thus, it is important to first have an understanding of how question and answer creation in a QA system is implemented before describing how the mechanisms of the illustrative embodiments are integrated in and augment such QA systems. It should be appreciated that the QA mechanisms described in FIGS. 1-3 are only examples and are not intended to state or imply any limitation with regard to the type of QA mechanisms with which the illustrative embodiments are implemented. Many modifications to the example QA system shown in FIGS. 1-3 may be implemented in various embodiments of the present invention without departing from the spirit and scope of the present invention.

As an overview, a Question Answering system (QA system) is an artificial intelligence application executing on data processing hardware that answers questions pertaining to a given subject-matter domain presented in natural language. The QA system receives inputs from various sources including input over a network, a corpus of electronic documents or other data, data from a content creator, information from one or more content users, and other such inputs from other possible sources of input. Data storage devices store the corpus of data. A content creator creates content in a document for use as part of a corpus of data with the QA system. The document may include any file, text, article, or source of data for use in the QA system. For example, a QA system accesses a body of knowledge about the domain, or subject matter area, e.g., financial domain, medical domain, legal domain, etc., where the body of knowledge (knowledgebase) can be organized in a variety of configurations, e.g., a structured repository of domain-specific information, such as ontologies, or unstructured data related to the domain, or a collection of natural language documents about the domain.

Content users input questions to the QA system which then answers the input questions using the content in the corpus of data by evaluating documents, sections of documents, portions of data in the corpus, or the like. When a process evaluates a given section of a document for semantic content, the process can use a variety of conventions to query such document from the QA system, e.g., sending the query to the QA system as a well-formed question which are then interpreted by the QA system and a response is provided containing one or more answers to the question. Semantic content is content based on the relation between signifiers, such as words, phrases, signs, and symbols, and what they stand for, their denotation, or connotation. In other words, semantic content is content that interprets an expression, such as by using Natural Language Processing.

As will be described in greater detail hereafter, the QA system receives an input question, parses the question to extract the major features of the question, uses the extracted features to formulate queries, and then applies those queries to the corpus of data. Based on the application of the queries to the corpus of data, the QA system generates a set of hypotheses, or candidate answers to the input question, by looking across the corpus of data for portions of the corpus of data that have some potential for containing a valuable response to the input question. The QA system then performs deep analysis on the language of the input question and the language used in each of the portions of the corpus of data found during the application of the queries using a variety of reasoning algorithms. There may be hundreds or even thousands of reasoning algorithms applied, each of which performs different analysis, e.g., comparisons, natural language analysis, lexical analysis, or the like, and generates a score. For example, some reasoning algorithms may look at the matching of terms and synonyms within the language of the input question and the found portions of the corpus of data. Other reasoning algorithms may look at temporal or spatial features in the language, while others may evaluate the source of the portion of the corpus of data and evaluate its veracity.

The scores obtained from the various reasoning algorithms indicate the extent to which the potential response is inferred by the input question based on the specific area of focus of that reasoning algorithm. Each resulting score is then weighted against a statistical model. The statistical model captures how well the reasoning algorithm performed at establishing the inference between two similar passages for a particular domain during the training period of the QA system. The statistical model is used to summarize a level of confidence that the QA system has regarding the evidence that the potential response, i.e. candidate answer, is inferred by the question. This process is repeated for each of the candidate answers until the QA system identifies candidate answers that surface as being significantly stronger than others and thus, generates a final answer, or ranked set of answers, for the input question.

As mentioned above, QA systems and mechanisms operate by accessing information from a corpus of data or information (also referred to as a corpus of content), analyzing it, and then generating answer results based on the analysis of this data. Accessing information from a corpus of data typically includes: a database query that answers questions about what is in a collection of structured records, and a search that delivers a collection of document links in response to a query against a collection of unstructured data (text, markup language, etc.). Conventional question answering systems are capable of generating answers based on the corpus of data and the input question, verifying answers to a collection of questions for the corpus of data, correcting errors in digital text using a corpus of data, and selecting answers to questions from a pool of potential answers, i.e. candidate answers.

Content creators, such as article authors, electronic document creators, web page authors, document database creators, and the like, determine use cases for products, solutions, and services described in such content before writing their content. Consequently, the content creators know what questions the content is intended to answer in a particular topic addressed by the content. Categorizing the questions, such as in terms of roles, type of information, tasks, or the like, associated with the question, in each document of a corpus of data allows the QA system to more quickly and efficiently identify documents containing content related to a specific query. The content may also answer other questions that the content creator did not contemplate that may be useful to content users. The questions and answers may be verified by the content creator to be contained in the content for a given document. These capabilities contribute to improved accuracy, system performance, machine learning, and confidence of the QA system. Content creators, automated tools, or the like, annotate or otherwise generate metadata for providing information useable by the QA system to identify these question and answer attributes of the content.

Operating on such content, the QA system generates answers for input questions using a plurality of intensive analysis mechanisms which evaluate the content to identify the most probable answers, i.e. candidate answers, for the input question. The most probable answers are output as a ranked listing of candidate answers ranked according to their relative scores or confidence measures calculated during evaluation of the candidate answers, as a single final answer having a highest ranking score or confidence measure, or which is a best match to the input question, or a combination of ranked listing and final answer.

FIG. 1 depicts a schematic diagram of one illustrative embodiment of a question/answer creation (QA) system 100 in a computer network 102. One example of a question/answer generation which may be used in conjunction with the principles described herein is described in U.S. Patent Application Publication No. 2011/0125734, which is herein incorporated by reference in its entirety. The QA system 100 is implemented on one or more computing devices 104 (comprising one or more processors and one or more memories, and potentially any other computing device elements generally known in the art including buses, storage devices, communication interfaces, and the like) connected to the computer network 102. The network 102 includes multiple computing devices 104 in communication with each other and with other devices or components via one or more wired and/or wireless data communication links, where each communication link comprises one or more of wires, routers, switches, transmitters, receivers, or the like. The QA system 100 and network 102 enables question/answer (QA) generation functionality for one or more QA system users via their respective computing devices 110-112. Other embodiments of the QA system 100 may be used with components, systems, sub-systems, and/or devices other than those that are depicted herein.

The QA system 100 is configured to implement a QA system pipeline 108 that receive inputs from various sources. For example, the QA system 100 receives input from the network 102, a corpus of electronic documents 106, QA system users, and/or other data and other possible sources of input. In one embodiment, some or all of the inputs to the QA system 100 are routed through the network 102. The various computing devices 104 on the network 102 include access points for content creators and QA system users. Some of the computing devices 104 include devices for a database storing the corpus of data 106 (which is shown as a separate entity in FIG. 1 for illustrative purposes only). Portions of the corpus of data 106 may also be provided on one or more other network attached storage devices, in one or more databases, or other computing devices not explicitly shown in FIG. 1. The network 102 includes local network connections and remote connections in various embodiments, such that the QA system 100 may operate in environments of any size, including local and global, e.g., the Internet.

In one embodiment, the content creator creates content in a document of the corpus of data 106 for use as part of a corpus of data with the QA system 100. The document includes any file, text, article, or source of data for use in the QA system 100. QA system users access the QA system 100 via a network connection or an Internet connection to the network 102, and input questions to the QA system 100 that are answered by the content in the corpus of data 106. In one embodiment, the questions are formed using natural language. The QA system 100 parses and interprets the question, and provides a response to the QA system user, e.g., QA system user 110, containing one or more answers to the question. In some embodiments, the QA system 100 provides a response to users in a ranked list of candidate answers while in other illustrative embodiments, the QA system 100 provides a single final answer or a combination of a final answer and ranked listing of other candidate answers.

The QA system 100 implements a QA system pipeline 108 which comprises a plurality of stages for processing an input question and the corpus of data 106. The QA system pipeline 108 generates answers for the input question based on the processing of the input question and the corpus of data 106. The QA system pipeline 108 will be described in greater detail hereafter with regard to FIG. 3.

In some illustrative embodiments, the QA system 100 may be the IBM Watson™ QA system available from International Business Machines Corporation of Armonk, N.Y., which is augmented with the mechanisms of the illustrative embodiments described hereafter. As outlined previously, the IBM Watson™ QA system receives an input question which it then parses to extract the major features of the question, that in turn are then used to formulate queries that are applied to the corpus of data. Based on the application of the queries to the corpus of data, a set of hypotheses, or candidate answers to the input question, are generated by looking across the corpus of data for portions of the corpus of data that have some potential for containing a valuable response to the input question. The IBM Watson™ QA system then performs deep analysis on the language of the input question and the language used in each of the portions of the corpus of data found during the application of the queries using a variety of reasoning algorithms. The scores obtained from the various reasoning algorithms are then weighted against a statistical model that summarizes a level of confidence that the IBM Watson™ QA system has regarding the evidence that the potential response, i.e. candidate answer, is inferred by the question. This process is be repeated for each of the candidate answers to generate ranked listing of candidate answers which may then be presented to the user that submitted the input question, or from which a final answer is selected and presented to the user. More information about the IBM Watson™ QA system may be obtained, for example, from the IBM Corporation website, IBM Redbooks, and the like. For example, information about the IBM Watson™ QA system can be found in Yuan et al., "Watson and Healthcare," IBM developerWorks, 2011 and "The Era of Cognitive Systems: An Inside Look at IBM Watson and How it Works" by Rob High, IBM Redbooks, 2012.

In accordance with an illustrative embodiment, QA system 100 includes a mechanism within QA system pipeline 108 that attempts to determine whether a given passage answers a question by determining whether some part of the passage is a paraphrase of the important parts of the question. The mechanism takes as input a question, a passage, and a candidate answer to the question, plus natural language processing analysis of each (e.g., a syntactic parse of the question and the passage). The mechanism divides the question and the passage into sequences of tokens. The mechanism then matches question tokens to passage tokens, including matching the focus of the question to any occurrence of the candidate answer in the passage. The mechanism uses a set of heuristics that depend on the matching information and/or the natural language processing analysis to identify useful subsequences of the passage tokens. The mechanism applies a paraphrase metric to compare the question tokens to each identified subsequence of the passage tokens. The mechanism asserts the best paraphrase metric score as an indicator of whether the passage contains a correct answer to the question.

FIG. 2 is a block diagram of an example data processing system in which aspects of the illustrative embodiments are implemented. Data processing system 200 is an example of a computer, such as server 104 or client 110 in FIG. 1, in which computer usable code or instructions implementing the processes for illustrative embodiments of the present invention are located. In one illustrative embodiment, FIG. 2 represents a server computing device, such as a server 104, which, which implements a QA system 100 and QA system pipeline 108 augmented to include the additional mechanisms of the illustrative embodiments described hereafter.

In the depicted example, data processing system 200 employs a hub architecture including north bridge and memory controller hub (NB/MCH) 202 and south bridge and input/output (I/O) controller hub (SB/ICH) 204. Processing unit 206, main memory 208, and graphics processor 210 are connected to NB/MCH 202. Graphics processor 210 is connected to NB/MCH 202 through an accelerated graphics port (AGP).

In the depicted example, local area network (LAN) adapter 212 connects to SB/ICH 204. Audio adapter 216, keyboard and mouse adapter 220, modem 222, read only memory (ROM) 224, hard disk drive (HDD) 226, CD-ROM drive 230, universal serial bus (USB) ports and other communication ports 232, and PCI/PCIe devices 234 connect to SB/ICH 204 through bus 238 and bus 240. PCI/PCIe devices may include, for example, Ethernet adapters, add-in cards, and PC cards for notebook computers. PCI uses a card bus controller, while PCIe does not. ROM 224 may be, for example, a flash basic input/output system (BIOS).

HDD 226 and CD-ROM drive 230 connect to SB/ICH 204 through bus 240. HDD 226 and CD-ROM drive 230 may use, for example, an integrated drive electronics (IDE) or serial advanced technology attachment (SATA) interface. Super I/O (SIO) device 236 is connected to SB/ICH 204.

An operating system runs on processing unit 206. The operating system coordinates and provides control of various components within the data processing system 200 in FIG. 2. As a client, the operating system is a commercially available operating system such as Microsoft® Windows 8®. An object-oriented programming system, such as the Java™ programming system, may run in conjunction with the operating system and provides calls to the operating system from Java™ programs or applications executing on data processing system 200.

As a server, data processing system 200 may be, for example, an IBM® eServer™ System P® computer system, running the Advanced Interactive Executive (AIX®) operating system or the LINUX operating system. Data processing system 200 may be a symmetric multiprocessor (SMP) system including a plurality of processors in processing unit 206. Alternatively, a single processor system may be employed.

Instructions for the operating system, the object-oriented programming system, and applications or programs are located on storage devices, such as HDD 226, and are loaded into main memory 208 for execution by processing unit 206. The processes for illustrative embodiments of the present invention are performed by processing unit 206 using computer usable program code, which is located in a memory such as, for example, main memory 208, ROM 224, or in one or more peripheral devices 226 and 230, for example.

A bus system, such as bus 238 or bus 240 as shown in FIG. 2, is comprised of one or more buses. Of course, the bus system may be implemented using any type of communication fabric or architecture that provides for a transfer of data between different components or devices attached to the fabric or architecture. A communication unit, such as modem 222 or network adapter 212 of FIG. 2, includes one or more devices used to transmit and receive data. A memory may be, for example, main memory 208, ROM 224, or a cache such as found in NB/MCH 202 in FIG. 2.

Those of ordinary skill in the art will appreciate that the hardware depicted in FIGS. 1 and 2 may vary depending on the implementation. Other internal hardware or peripheral devices, such as flash memory, equivalent non-volatile memory, or optical disk drives and the like, may be used in addition to or in place of the hardware depicted in FIGS. 1 and 2. Also, the processes of the illustrative embodiments may be applied to a multiprocessor data processing system, other than the SMP system mentioned previously, without departing from the spirit and scope of the present invention.

Moreover, the data processing system 200 may take the form of any of a number of different data processing systems including client computing devices, server computing devices, a tablet computer, laptop computer, telephone or other communication device, a personal digital assistant (PDA), or the like. In some illustrative examples, data processing system 200 may be a portable computing device that is configured with flash memory to provide non-volatile memory for storing operating system files and/or user-generated data, for example. Essentially, data processing system 200 may be any known or later developed data processing system without architectural limitation.

FIG. 3 illustrates a QA system pipeline for processing an input question in accordance with one illustrative embodiment. The QA system pipeline of FIG. 3 may be implemented, for example, as QA system pipeline 108 of QA system 100 in FIG. 1. It should be appreciated that the stages of the QA system pipeline shown in FIG. 3 are implemented as one or more software engines, components, or the like, which are configured with logic for implementing the functionality attributed to the particular stage. Each stage is implemented using one or more of such software engines, components or the like. The software engines, components, etc. are executed on one or more processors of one or more data processing systems or devices and utilize or operate on data stored in one or more data storage devices, memories, or the like, on one or more of the data processing systems. The QA system pipeline of FIG. 3 is augmented, for example, in one or more of the stages to implement the improved mechanism of the illustrative embodiments described hereafter, additional stages may be provided to implement the improved mechanism, or separate logic from the pipeline 300 may be provided for interfacing with the pipeline 300 and implementing the improved functionality and operations of the illustrative embodiments.

As shown in FIG. 3, the QA system pipeline 300 comprises a plurality of stages 310-380 through which the QA system operates to analyze an input question and generate a final response. In an initial question input stage 310, the QA system receives an input question that is presented in a natural language format. That is, a user inputs, via a user interface, an input question for which the user wishes to obtain an answer, e.g., "Who are Washington's closest advisors?" In response to receiving the input question, the next stage of the QA system pipeline 300, i.e. the question and topic analysis stage 320, parses the input question using natural language processing (NLP) techniques to extract major features from the input question, and classify the major features according to types, e.g., names, dates, or any of a plethora of other defined topics. For example, in the example question above, the term "who" may be associated with a topic for "persons" indicating that the identity of a person is being sought, "Washington" may be identified as a proper name of a person with which the question is associated, "closest" may be identified as a word indicative of proximity or relationship, and "advisors" may be indicative of a noun or other language topic.

In addition, the extracted major features include key words and phrases classified into question characteristics, such as the focus of the question, the lexical answer type (LAT) of the question, and the like. As referred to herein, a lexical answer type (LAT) is a word in, or a word inferred from, the input question that indicates the type of the answer, independent of assigning semantics to that word. For example, in the question "What maneuver was invented in the 1500s to speed up the game and involves two pieces of the same color?," the LAT is the string "maneuver." The focus of a question is the part of the question that, if replaced by the answer, makes the question a standalone statement. For example, in the question "What drug has been shown to relieve the symptoms of ADD with relatively few side effects?," the focus is "drug" since if this word were replaced with the answer, e.g., the answer "Adderall" can be used to replace the term "drug" to generate the sentence "Adderall has been shown to relieve the symptoms of ADD with relatively few side effects." The focus often, but not always, contains the LAT. On the other hand, in many cases it is not possible to infer a meaningful LAT from the focus.

Referring again to FIG. 3, the identified major features are then used during the question decomposition stage 330 to decompose the question into one or more queries that are applied to the corpora of data/information 345 in order to generate one or more hypotheses. The queries are generated in any known or later developed query language, such as the Structure Query Language (SQL), or the like. The queries are applied to one or more databases storing information about the electronic texts, documents, articles, websites, and the like, that make up the corpora of data/information 345. That is, these various sources themselves, different collections of sources, and the like, represent a different corpus 347 within the corpora 345. There may be different corpora 347 defined for different collections of documents based on various criteria depending upon the particular implementation. For example, different corpora may be established for different topics, subject matter categories, sources of information, or the like. As one example, a first corpus may be associated with healthcare documents while a second corpus may be associated with financial documents. Alternatively, one corpus may be documents published by the U.S. Department of Energy while another corpus may be IBM Redbooks documents. Any collection of content having some similar attribute may be considered to be a corpus 347 within the corpora 345.

The queries are applied to one or more databases storing information about the electronic texts, documents, articles, websites, and the like, that make up the corpus of data/information, e.g., the corpus of data 106 in FIG. 1. The queries are applied to the corpus of data/information at the hypothesis generation stage 340 to generate results identifying potential hypotheses for answering the input question, which can then be evaluated. That is, the application of the queries results in the extraction of portions of the corpus of data/information matching the criteria of the particular query. These portions of the corpus are then analyzed and used, during the hypothesis generation stage 340, to generate hypotheses for answering the input question. These hypotheses are also referred to herein as "candidate answers" for the input question. For any input question, at this stage 340, there may be hundreds of hypotheses or candidate answers generated that may need to be evaluated.

The QA system pipeline 300, in stage 350, then performs a deep analysis and comparison of the language of the input question and the language of each hypothesis or "candidate answer," as well as performs evidence scoring to evaluate the likelihood that the particular hypothesis is a correct answer for the input question. As mentioned above, this involves using a plurality of reasoning algorithms, each performing a separate type of analysis of the language of the input question and/or content of the corpus that provides evidence in support of, or not in support of, the hypothesis. Each reasoning algorithm generates a score based on the analysis it performs which indicates a measure of relevance of the individual portions of the corpus of data/information extracted by application of the queries as well as a measure of the correctness of the corresponding hypothesis, i.e. a measure of confidence in the hypothesis. There are various ways of generating such scores depending upon the particular analysis being performed. In generally, however, these algorithms look for particular terms, phrases, or patterns of text that are indicative of terms, phrases, or patterns of interest and determine a degree of matching with higher degrees of matching being given relatively higher scores than lower degrees of matching.

Thus, for example, an algorithm may be configured to look for the exact term from an input question or synonyms to that term in the input question, e.g., the exact term or synonyms for the term "movie," and generate a score based on a frequency of use of these exact terms or synonyms. In such a case, exact matches will be given the highest scores, while synonyms may be given lower scores based on a relative ranking of the synonyms as may be specified by a subject matter expert (person with knowledge of the particular domain and terminology used) or automatically determined from frequency of use of the synonym in the corpus corresponding to the domain. Thus, for example, an exact match of the term "movie" in content of the corpus (also referred to as evidence, or evidence passages) is given a highest score. A synonym of movie, such as "motion picture" may be given a lower score but still higher than a synonym of the type "film" or "moving picture show." Instances of the exact matches and synonyms for each evidence passage may be compiled and used in a quantitative function to generate a score for the degree of matching of the evidence passage to the input question.

Thus, for example, a hypothesis or candidate answer to the input question of "What was the first movie?" is "The Horse in Motion." If the evidence passage contains the statements "The first motion picture ever made was 'The Horse in Motion' in 1878 by Eadweard Muybridge. It was a movie of a horse running," and the algorithm is looking for exact matches or synonyms to the focus of the input question, i.e. "movie," then an exact match of "movie" is found in the second sentence of the evidence passage and a highly scored synonym to "movie," i.e. "motion picture," is found in the first sentence of the evidence passage. This may be combined with further analysis of the evidence passage to identify that the text of the candidate answer is present in the evidence passage as well, i.e. "The Horse in Motion." These factors may be combined to give this evidence passage a relatively high score as supporting evidence for the candidate answer "The Horse in Motion" being a correct answer.

It should be appreciated that this is just one simple example of how scoring can be performed. Many other algorithms of various complexity may be used to generate scores for candidate answers and evidence without departing from the spirit and scope of the present invention.

In the synthesis stage 360, the large number of scores generated by the various reasoning algorithms are synthesized into confidence scores or confidence measures for the various hypotheses. This process involves applying weights to the various scores, where the weights have been determined through training of the statistical model employed by the QA system and/or dynamically updated. For example, the weights for scores generated by algorithms that identify exactly matching terms and synonym may be set relatively higher than other algorithms that are evaluating publication dates for evidence passages. The weights themselves may be specified by subject matter experts or learned through machine learning processes that evaluate the significance of characteristics evidence passages and their relative importance to overall candidate answer generation.

The weighted scores are processed in accordance with a statistical model generated through training of the QA system that identifies a manner by which these scores may be combined to generate a confidence score or measure for the individual hypotheses or candidate answers. This confidence score or measure summarizes the level of confidence that the QA system has about the evidence that the candidate answer is inferred by the input question, i.e. that the candidate answer is the correct answer for the input question.

The resulting confidence scores or measures are processed by a final confidence merging and ranking stage 370 which compares the confidence scores and measures to each other, compares them against predetermined thresholds, or performs any other analysis on the confidence scores to determine which hypotheses/candidate answers are the most likely to be the correct answer to the input question. The hypotheses/candidate answers are ranked according to these comparisons to generate a ranked listing of hypotheses/candidate answers (hereafter simply referred to as "candidate answers"). From the ranked listing of candidate answers, at stage 380, a final answer and confidence score, or final set of candidate answers and confidence scores, are generated and output to the submitter of the original input question via a graphical user interface or other mechanism for outputting information.

In accordance with an illustrative embodiment, in stages 340, 350, a mechanism divides the question and passage into sequences of tokens and matches the question tokens to the passage tokens. The mechanism applies a paraphrase metric to compare the question tokens to the sequence of passage tokens and asserts the best resulting paraphrase metric score as an indicator of whether the passage contains a correct answer to the question.

The paraphrase metric may be a machine translation metric, because some machine translation metrics have been shown to be effective paraphrase metrics.

The illustrative embodiments may run the entire pipeline 300 repeatedly with different paraphrase metrics to produce different outputs. In one embodiment, pipeline 300 is run repeatedly with different paraphrase metrics to produce different outputs on a set of annotated sample data, and then those metrics that are not effective on that sample data can be discarded and not used in the deployed system.

In one example embodiment, the mechanism also finds a subsequence of the question tokens that includes all of the important question content. The mechanism then uses the subsequence of question tokens instead of the original question tokens for application of the paraphrase metric.

In one embodiment, the mechanism uses a set of heuristics that depend on the matching information and/or the natural language processing analysis to identify useful subsequences of passage tokens. In one example embodiment, the mechanism restricts the sequence of passage tokens to only contiguous sequences. For example, given the input "A B C D," the subsequence "B C" is a contiguous subsequence, but "B D" is a non-contiguous subsequence. Alternatively, the mechanism may allow either contiguous or non-contiguous subsequences.

Final confidence merging and ranking phase 370 then determines final candidate answer confidence scores based on paraphrase metric scores. The paraphrase metric is just one factor among many that would determine a final confidence score.

Figure 4:
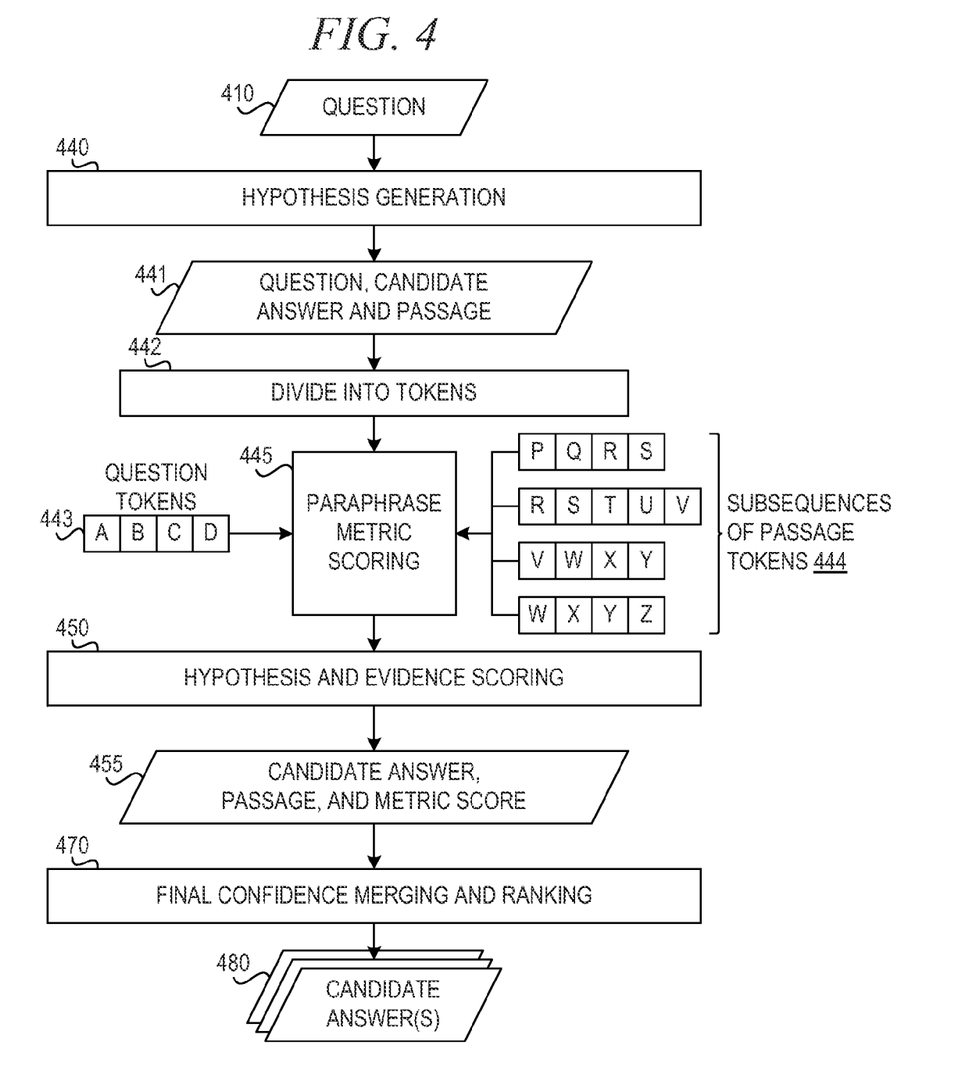
FIG. 4 is a block diagram illustrating a mechanism for using paraphrase metrics for answering questions in accordance with an illustrative embodiment.

FIG. 4 is a block diagram illustrating a mechanism for using paraphrase metrics for answering questions in accordance with an illustrative embodiment. Hypotheses generation phase 440 receives question 410. As stated above with reference to FIG. 3, each phase of the QA system pipeline comprises combinations of reasoning algorithms for performing analysis, annotation, and/or natural language processing on portions and features of question text and passages from the corpus.

In accordance with the illustrative embodiment, given a question, hypothesis generation phase 440 generates a candidate answer contained within a supporting passage. Hypothesis generation phase 440 passes the question, candidate answer, and supporting passage 441 to component 442, which divides the question into question tokens 443 and divides the passage into subsequences of passage tokens 444, as described above.

Paraphrase metric scoring component 445 produces a score for how well content in the passage aligns with the question. Paraphrase metric scoring component 445 may comprise one or more reasoning algorithms within QA system pipeline 300 in FIG. 3, for example, or more specifically, within hypothesis generation stage 440, hypothesis and evidence scoring phase 450, or a combination of stages 440 and 450.

Paraphrase metric scoring component 445 matches question tokens 443 to the subsequences of passage tokens 444 to attempt to match the focus of the question with occurrence of the candidate answer in the passage. Paraphrase metric scoring component 445 may implement any of the following methods for aligning the focus of the question with the candidate answer in the passage:

1. Modify the implementation of the paraphrase metric to treat the focus of the question as a match for the candidate answer in the passage.

2. Modify the question, replacing the text of the focus of the question with the text of the candidate answer.

3. Modify the passage, replacing the text of the candidate answer with the text of the focus of the question.

4. Modify both the question and the passage, replacing the text of the focus of the question and the candidate answer with a common reserved constant string.

After applying one of the above methods, paraphrase metric scoring component 445 identifies one or more portions or subsequences 444 of the passage to compare to the question, apply the metric to compare the question to each portion of the passage, and then compute a final score, which is the best score across all portions. The basic algorithm for identifying portions of the passage is to divide the passage into tokens and take all token subsequences. For example, given the passage "A B C," paraphrase metric scoring component 445 would find subsequences "A," "A B," "A B C," "B," "B C," and "C."

However, for a long passage, the number of subsequences is very large. Paraphrase metric scoring component 445 may restrict the computation to use a subset of all subsequences. To that end, paraphrase metric scoring component 445 may employ the following restrictions on subsequences to consider:

1. The number of tokens in the subsequence must be within K of the number of tokens in the question, for some constant K.

2. The subsequence must contain at least N tokens that match tokens in the question.

3. The subsequence must contain at least N non-stop-word tokens that match tokens in the question.

4. The subsequence must contain the candidate answer.

5. The subsequence may not contain a sentence boundary.

6. The subsequence must begin at a sentence boundary.

7. The subsequence must end at a sentence boundary.

8. The subsequence must begin at a clause boundary.

9. The subsequence must end at a clause boundary.

10. The subsequence must be contiguous.

11. The subsequence must include no more than C contiguous sub-subsequences.

In addition, paraphrase metric scoring component 445 can consider various logical combinations of restrictions above. For example, (restriction #1 OR (restriction #4 AND restriction #5)) indicates that the subsequence must be within K tokens of the question in length or begins and ends at a sentence boundary. Given the set of all subsequences that meet the restrictions, paraphrase metric scoring component 445 applies the paraphrase metric to compare the question to each of the subsequences and report the best result.

Consider an example question of "What is the center of the solar system?" with a candidate answer of "Sun." A possible justifying passage is as follows: "The solar system consists of the Sun, at its center, plus eight planets, their moons, and many other objects. Most of the mass of the solar system is in the Sun. Jupiter also has a substantial amount of mass." If the mechanism identifies tokens by saying that all text separated by white space is a token (a common practice), then the question has eleven tokens. For this example, the mechanism employs the following combination of restrictions:

((restriction #1 with K=0) OR (restriction #6 AND restriction #7)) AND (restriction #3 with N=2) AND (restriction #4 AND restriction #10).

Given the above restrictions, the following are examples of valid subsequences to consider:

"The solar system consists of the Sun, at its center, plus" is valid because it has eleven tokens, has four non-stop-word token matches, including the focus matches the candidate answer, contains "Sun," and is a contiguous subsequence of the passage.

"solar system consists of the Sun, at its center, plus eight" is valid because it has eleven tokens, has four non-stop-word token matches, including the focus matches the candidate answer, contains "Sun," and is a contiguous subsequence of the passage.

"Most of the mass of the solar system is in the Sun" is valid because it begins and ends at a sentence boundary, has three non-stop-word token matches, including the focus matches the candidate answer, contains "Sun," and is a contiguous subsequence of the passage.

The following are not subsequences that are not considered under the above restrictions:

"The solar system consists of the Sun, at its center" is not valid because it has fewer than eleven tokens and does not end at a sentence boundary.

"Jupiter also has a substantial amount of mass" is not valid because it does not contain the candidate answer and because it does not have the required number of non-stop-word token matches.

Hypothesis and evidence scoring stage 450 then provides the candidate answer, passage, and paraphrase metric score 455 to final confidence merging and ranking stage 470. Given a plurality of candidate answers with associated paraphrase metric scores, as well as other useful information from other stages or other reasoning algorithms, final confidence merging and ranking stage 470 then generates and provides one or more candidate answers 480 for answering question 410.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

Figure 5:
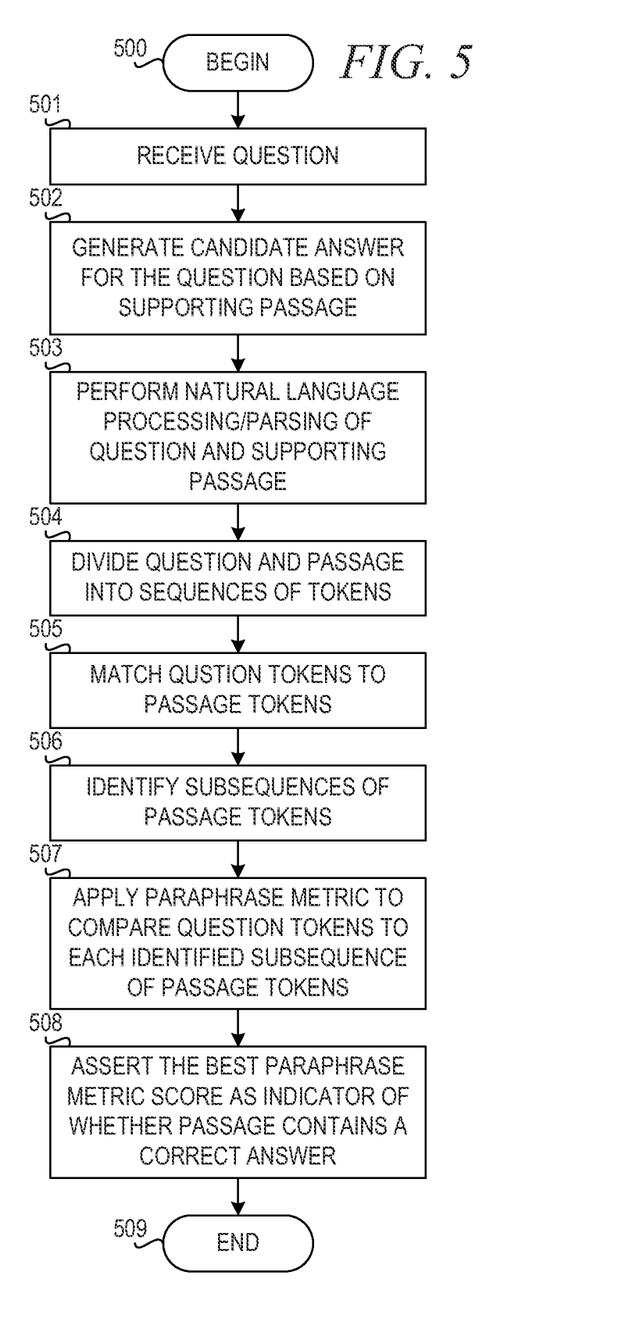
FIG. 5 is a flowchart illustrating operation of a mechanism for using paraphrase metrics for answering questions in accordance with an illustrative embodiment.

FIG. 5 is a flowchart illustrating operation of a mechanism for using paraphrase metrics for answering questions in accordance with an illustrative embodiment. Operation begins (block 500), and the mechanism receives a question (block 501). The mechanism generates a candidate answer for the question based on a supporting passage from a corpus of documents (block 502). The mechanism performs natural language processing and/or parsing of the question and the supporting passage (block 503).

The mechanism then divides the question and the passage into sequences of tokens (block 504) and matches question tokens to passage tokens (block 505). The mechanism uses heuristics that depend on the matching information and/or natural language processing analysis to identify useful subsequences of passage tokens (block 506). The mechanism then applies a paraphrase metric to compare the question tokens to each identified subsequence of passage tokens (block 507). Next, the mechanism asserts the best paraphrase metric score as an indicator of whether the passage contains a candidate answer that is a correct answer to the question (block 508). Thereafter, operation ends (block 509).

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

As noted above, it should be appreciated that the illustrative embodiments may take the form of an entirely hardware embodiment, an entirely software embodiment or an embodiment containing both hardware and software elements. In one example embodiment, the mechanisms of the illustrative embodiments are implemented in software or program code, which includes but is not limited to firmware, resident software, microcode, etc.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers. Network adapters may also be coupled to the system to enable the data processing system to become coupled to other data processing systems or remote printers or storage devices through intervening private or public networks. Modems, cable modems and Ethernet cards are just a few of the currently available types of network adapters.

The description of the present invention has been presented for purposes of illustration and description, and is not intended to be exhaustive or limited to the invention in the form disclosed. Many modifications and variations will be apparent to those of ordinary skill in the art without departing from the scope and spirit of the described embodiments. The embodiment was chosen and described in order to best explain the principles of the invention, the practical application, and to enable others of ordinary skill in the art to understand the invention for various embodiments with various modifications as are suited to the particular use contemplated. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method, in a data processing system, for using paraphrase metrics for answering questions, the method comprising:

receiving an input question;

generating a candidate answer from a corpus of information, wherein the candidate answer has a supporting passage from the corpus of information;

dividing the input question into a first sequence of tokens;

dividing the supporting passage into a second sequence of tokens;

matching question tokens from the first set of tokens to passage tokens from the second set of tokens, wherein matching the question tokens to the passage tokens comprises identifying a focus of the input question and matching the focus of the input question to an occurrence of the candidate answer in the supporting passage, wherein matching the focus of the input question to an occurrence of the candidate answer in the supporting passage comprises:

treating the focus of the question as a match for the candidate answer;

modifying the input question to replace text of the focus of the question with text of the candidate answer;

modifying the passage to replace text of the candidate answer with text of the focus of the question; or modify the input question and the passage to replace text of the focus of the question and text of the candidate answer with a common reserved constant string;

identifying a plurality of subsequences of tokens within the second sequence of tokens;

applying a paraphrase metric to compare the first sequence of tokens to each of the plurality of subsequences of tokens to generate a plurality of paraphrase metric scores; and determining a confidence score for the candidate answer based on a highest paraphrase metric score within the plurality of paraphrase metric scores.

2. The method of claim 1, wherein the paraphrase metric is a machine translation metric.

3. The method of claim 1, further comprising applying a plurality of paraphrase metrics to produce a plurality of results.

4. The method of claim 3, further comprising eliminating a given paraphrase metric that is determined to be ineffective based on the plurality of results from future application.

5. The method of claim 1, wherein dividing the input question into the first sequence of tokens comprises:
dividing the input question into a plurality of sequences of question tokens;
identifying a given sequence of question tokens within the plurality of sequences of question tokens having important content of the input question as the first sequence of tokens.

6. The method of claim 1, wherein identifying the plurality of subsequences of tokens within the second sequence of tokens comprises restricting the plurality of subsequences of tokens such that:
a number of tokens in each subsequence of tokens must be within a first predetermined number of a number of tokens in the first sequence of tokens;
each subsequence must contain at least a second predetermined number of tokens that match tokens in the first sequence of tokens;
each subsequence must contain at least a third predetermined number of non-stop-word tokens that match tokens in the first sequence of tokens;
each subsequence must contain the candidate answer;
each subsequence may not contain a sentence boundary;
each subsequence must begin at a sentence boundary;
each subsequence must end at a sentence boundary;
each subsequence must begin at a clause boundary;
each subsequence must end at a clause boundary;
each subsequence must be contiguous; or
each subsequence must include no more than a fourth predetermined number of contiguous sub-subsequences.

7. A computer program product comprising a computer readable storage medium having a computer readable program stored therein, wherein the computer readable program, when executed on a computing device, causes the computing device to:
receive an input question;
generate a candidate answer from a corpus of information, wherein the candidate answer has a supporting passage from the corpus of information;
divide the input question into a first sequence of tokens;
divide the supporting passage into a second sequence of tokens;
match question tokens from the first set of tokens to passage tokens from the second set of tokens, wherein matching the question tokens to the passage tokens comprises identifying a focus of the input question and matching the focus of the input question to an occurrence of the candidate answer in the supporting passage, wherein matching the focus of the input question to an occurrence of the candidate answer in the supporting passage comprises:
treating the focus of the question as a match for the candidate answer;
modifying the input question to replace text of the focus of the question with text of the candidate answer;
modifying the passage to replace text of the candidate answer with text of the focus of the question; or
modify the input question and the passage to replace text of the focus of the question and text of the candidate answer with a common reserved constant string;
identify a plurality of subsequences of tokens within the second sequence of tokens;
apply a paraphrase metric to compare the first sequence of tokens to each of the plurality of subsequences of tokens to generate a plurality of paraphrase metric scores; and
determine a confidence score for the candidate answer based on a highest paraphrase metric score within the plurality of paraphrase metric scores.

8. The computer program product of claim 7, wherein dividing the input question into the first sequence of tokens comprises:
dividing the input question into a plurality of sequences of question tokens;
identifying a given sequence of question tokens within the plurality of sequences of question tokens having important content of the input question as the first sequence of tokens.

9. The computer program product of claim 7, wherein identifying the plurality of subsequences of tokens within the second sequence of tokens comprises restricting the plurality of subsequences of tokens such that:
a number of tokens in each subsequence of tokens must be within a first predetermined number of a number of tokens in the first sequence of tokens;
each subsequence must contain at least a second predetermined number of tokens that match tokens in the first sequence of tokens;
each subsequence must contain at least a third predetermined number of non-stop-word tokens that match tokens in the first sequence of tokens;
each subsequence must contain the candidate answer;
each subsequence may not contain a sentence boundary;
each subsequence must begin at a sentence boundary;
each subsequence must end at a sentence boundary;
each subsequence must begin at a clause boundary;
each subsequence must end at a clause boundary;
each subsequence must be contiguous; or
each subsequence must include no more than a fourth predetermined number of contiguous sub-subsequences.

10. An apparatus comprising:
a processor; and
a memory coupled to the processor, wherein the memory comprises instructions which, when executed by the processor, cause the processor to:
receive an input question;
generate a candidate answer from a corpus of information, wherein the candidate answer has a supporting passage from the corpus of information;
divide the input question into a first sequence of tokens;
divide the supporting passage into a second sequence of tokens;
match question tokens from the first set of tokens to passage tokens from the second set of tokens, wherein matching the question tokens to the passage tokens comprises identifying a focus of the input question and matching the focus of the input question to an occurrence of the candidate answer in the supporting passage, wherein matching the focus of the input question to an occurrence of the candidate answer in the supporting passage comprises:

treating the focus of the question as a match for the candidate answer;

modifying the input question to replace text of the focus of the question with text of the candidate answer;

modifying the passage to replace text of the candidate answer with text of the focus of the question; or modify the input question and the passage to replace text of the focus of the question and text of the candidate answer with a common reserved constant string;

identify a plurality of subsequences of tokens within the second sequence of tokens;

apply a paraphrase metric to compare the first sequence of tokens to each of the plurality of subsequences of tokens to generate a plurality of paraphrase metric scores; and determine a confidence score for the candidate answer based on a highest paraphrase metric score within the plurality of paraphrase metric scores.

11. The apparatus of claim 10, wherein dividing the input question into the first sequence of tokens comprises:

dividing the input question into a plurality of sequences of question tokens;

identifying a given sequence of question tokens within the plurality of sequences of question tokens having important content of the input question as the first sequence of tokens.

\* \* \* \* \*